United States Patent [19]

Holland

[11] 4,450,994
[45] May 29, 1984

[54] COUPON ORGANIZER

[76] Inventor: Chester R. Holland, 375 Fairfax Rd., Drexel Hill, Pa. 19026

[21] Appl. No.: 286,607

[22] Filed: Jul. 24, 1981

[51] Int. Cl.³ .............................................. B60R 11/00
[52] U.S. Cl. .................................... 224/277; 206/425; 220/22
[58] Field of Search ........................ 224/277, 30 A, 36; 280/3.99 A, 289; 40/371, 384; D19/75; D3/56; 206/425, 575; 220/22

[56] References Cited

U.S. PATENT DOCUMENTS

| | | | |
|---|---|---|---|
| 304,627 | 9/1884 | Du Bois | 220/22 |
| 554,060 | 2/1896 | Greene | 220/22 |
| 2,554,865 | 5/1951 | Lydick | 224/36 |
| 2,558,372 | 6/1948 | Nidermayer . | |
| 3,251,543 | 5/1965 | Bush et al. . | |
| 3,265,297 | 5/1965 | Behrens . | |
| 3,288,478 | 1/1964 | Powers . | |
| 3,438,644 | 4/1969 | McMillan et al. . | |
| 3,956,841 | 5/1976 | Hensel . | |
| 4,260,055 | 4/1981 | Slaybaugh | 206/425 X |
| 4,274,567 | 6/1981 | Sawyer | 224/277 X |

Primary Examiner—Steven M. Pollard
Assistant Examiner—David Voorhees
Attorney, Agent, or Firm—Howson and Howson

[57] ABSTRACT

An accessory is provided for enabling a shopper to organize coupons to facilitate shopping. The accessory comprises a receptacle which has a lid with a carrying handle which enables the accessory to be carried easily to a store and releasably clamped to the handle of a shopping cart at the upper rear end of the shopping cart basket. The receptacle contains a series of dividers for segregating coupons in accordance with various headings.

1 Claim, 5 Drawing Figures

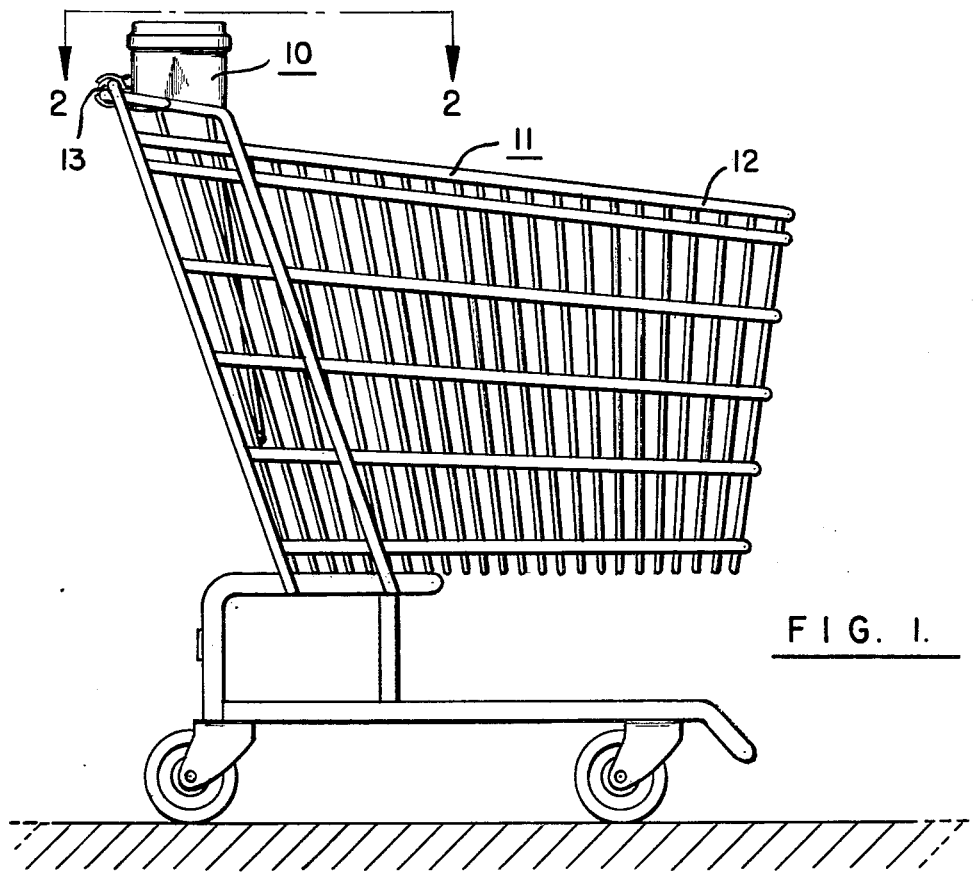
FIG. 1.
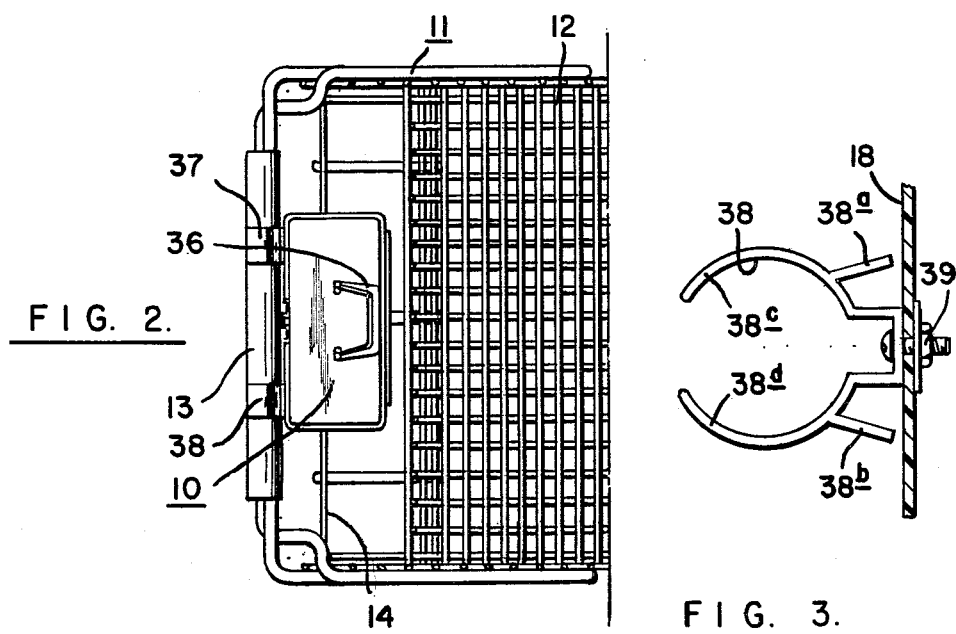
FIG. 2.
FIG. 3.

COUPON ORGANIZER

FIELD OF THE INVENTION

The present invention relates to shopping accessories; more particularly, the present invention relates to an accessory designed to be used by a shopper in combination with a shopping cart to facilitate the use of coupons while shopping.

BACKGROUND OF THE INVENTION

For many years it has been the custom of various stores to utilize coupons to attract customers. Generally, this involves the printing of a coupon having a predetermined redemption value in a local newspaper. The shopper usually cuts-out desired coupons and, after selecting the product for which the coupon is to be used, presents the coupon for credit to the clerk at the check-out counter of the store.

While the use of coupons provides a shopper with certain savings, there are some limitations in the use of coupons. For instance, depending upon the number of coupons and the types of products for which the coupons are being used, it may be necessary for a shopper to handle a large number of different coupons on a given shopping trip. Different shoppers have different ways of organizing the coupons; however, heretofore, no known means have been available to enable a shopper to organize their coupons prior to shopping and to have the same readily available while shopping and checking-out. As a result, the lack of organization of coupons slows the shopping process because it is more difficult for shoppers to keep track of coupons in an organized manner and to present the same in an orderly fashion to the check-out clerk.

OBJECTS OF THE INVENTION

With the foregoing in mind, a primary object of the present invention is to provide a novel coupon organizer which enables a shopper to utilize coupons more efficiently while shopping.

Another object of the present invention is to provide a unique accessory which is designed to be used in combination with a shopping cart to enable a shopper to organize coupons in advance of shopping and to have the organized coupons readily available while shopping and checking-out.

A further object of the present invention is to provide a lightweight, portable accessory which is designed to be releasably attached to the handle of a shopping cart to enable a shopper to utilize coupons more efficiently while shopping.

SUMMARY OF THE INVENTION

More specifically, the present invention provides a novel device which enables a shopper to organize coupons in advance of shopping and to have the same readily available during shopping and while checking-out. The device includes a box having a lid with a carrying handle and a series of cards dividing the receptacle into preselected categories. Clamping means releasably connects one side of the box to a shopping cart adjacent the upper rear end of the basket, so that when the lid is opened, the cards face the shopper when standing behind the shopping cart. With this device, a shopper can clip coupons from an advertising copy and place them in appropriate categories so that they are readily accessible in an organized manner when selecting products and checking-out the selected products.

BRIEF DESCRIPTION OF THE DRAWINGS

The foregoing and other objects, features and advantages of the present invention should become apparent from the following description when taken in conjunction with the accompanying drawings, in which:

FIG. 1 is a side elevational view of a coupon organizer which embodies the present invention and which is shown attached to the handle of a conventional shopping cart;

FIG. 2 is a fragmentary plan view taken on line 2—2 FIG. 1;

FIG. 3 is an enlarged fragmentary sectional view illustrating one of the clamps used to connect the organizer to the handle of a shopping cart;

DESCRIPTION OF PREFERRED EMBODIMENT

Figure 4:
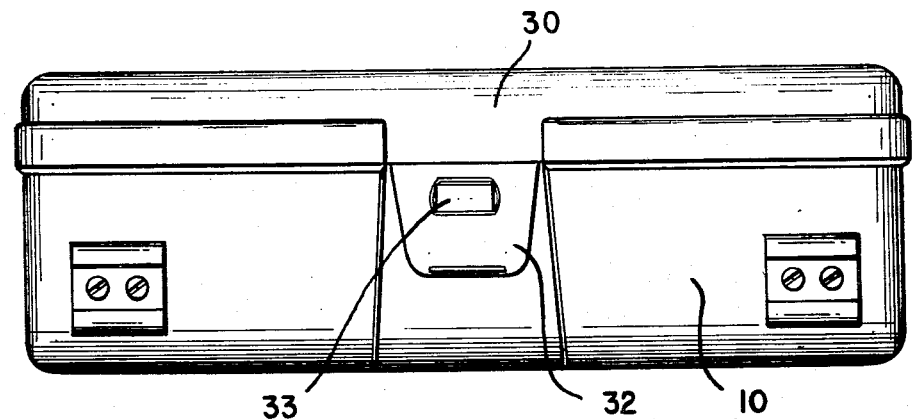
FIG. 4 is a side elevational view of the coupon organizer illustrating the disposition of the clamps used to connect the organizer to the handle of the shopping cart.

Referring now to the drawings, FIG. 1 illustrates a coupon organizer 10 which embodies the present invention and which is shown installed as an accessory on a conventional shopping cart 11. As seen therein, the shopping cart 11 has a basket 12 adapted to hold products selected by a shopper in the course of shopping. The shopping cart 11 is constructed with a handle 13 at the upper rear end of the basket 12 to enable the shopper to guide the cart 11 in the customary manner. The shopping cart 11 also has a wire 14 which extends widthwise of the basket 12 forwardly of the handle 13 and adjacent thereto. While a typical shopping cart 11 is illustrated in FIG. 1, the particular details of construction may vary from manufacturer to manufacturer, it being understood that the coupon organizer accessory 10 may be utilized in combination with various types of carts in the manner to be described.

In accordance with the present invention, the coupon organizer 10 is designed to enable a shopper to segregate coupons at home into a variety of categories so that the coupons are readily accessible to the shopper in an organized manner when selecting and checking-out products in a store. To this end, the coupon organizer 10 comprises a box or receptacle having a generally rectangular interior cavity 16 which is divided into right and left-hand sections by a partition 17 which extends vertically between parallel side walls 18 and 19. The right-hand section of the receptacle contains a series of card-like dividers, such as the dividers 20, 21 and 22. Each of the dividers carries a tab with a notation thereon for the purpose of segregating the coupons into various categories, such as cereal and foil wraps, indicated at 21 and 22, respectively. The divider 20 is used in the manner to be described to facilitate checking-out.

The left-hand section of the receptacle 16 may be used advantageously to contain various items useful in shopping. For instance, it may include a pair of scissors 23, a pad 24, an inexpensive hand-held calculator 25, and a pencil 26.

Figure 5:
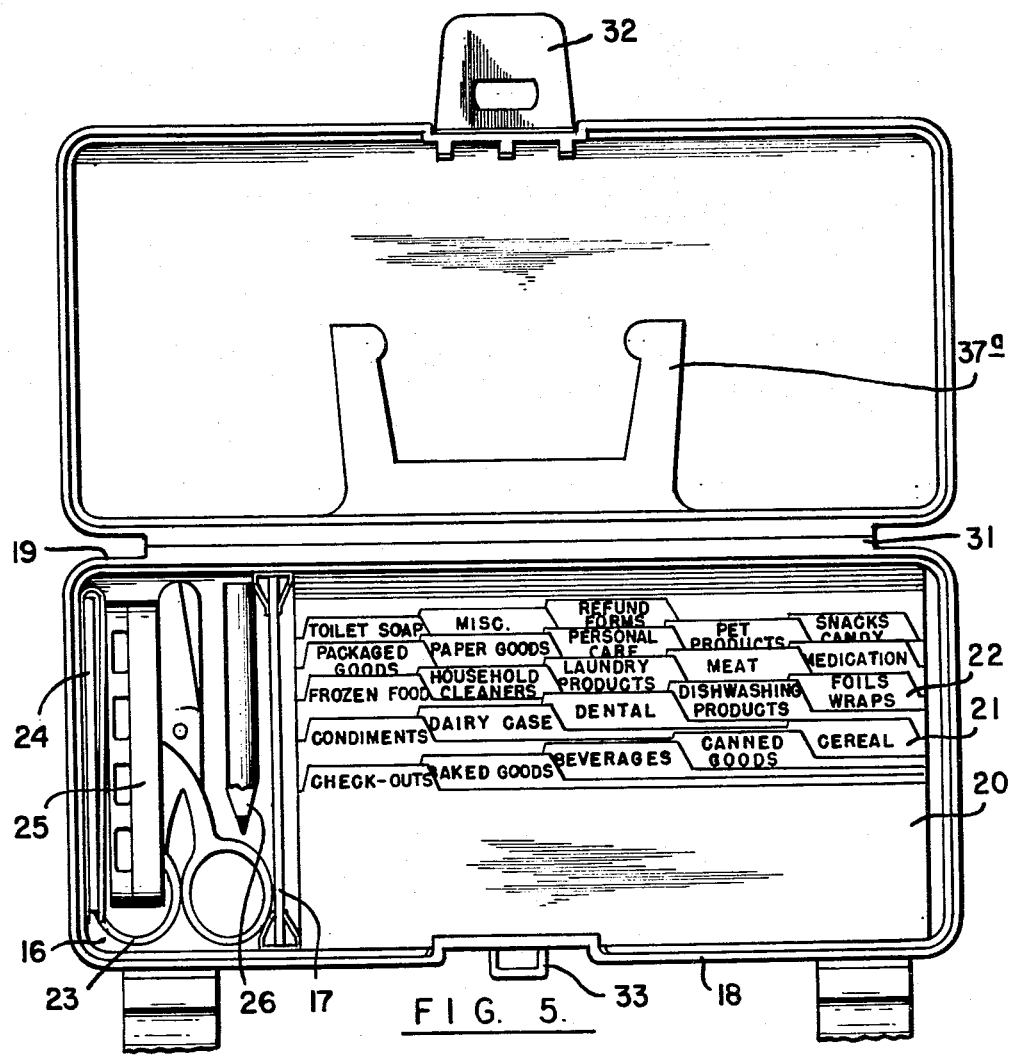
FIG. 5 is a plan view illustrating the coupon organizer with its lid opened to illustrate the arrangement of the interior of the organizer, and particularly the cards used to segregate the coupons.

Referring now to FIGS. 4 and 5, the coupon organizer 10 has a lid 30 which is connected to the box 16 by a hinge 31 extending along the upper edge of the front side wall 19. A hasp 32, 33 formed integrally with the lid 30 and side wall 19, respectively cooperates to secure the lid 30 releasably either in a closed configuration as illustrated in FIG. 4 or in an open configuration as illustrated in FIG. 5. As best seen in FIG. 2, a carrying handle 36 is hingedly connected to the top of the lid 30 and lays flat in a recess 37a in the lid 30 when the handle 36 is not in use. Preferably, the box and lid are fabricated of injection molded plastic to provide a lightweight, readily portable, yet inexpensive article.

The coupon organizer 10 can be easily connected and disconnected from the handle 13 of the shopping cart 11. To this end, clamping means is provided for releasably connecting the coupon organizer 10 to the shopping cart handle 13. The clamping and unclamping is achieved simply by pulling the coupon organizer 10 rearwardly toward the handle or pushing the coupon organizer 10 forwardly away from the handle to disengage the same laterally.

Referring now to FIGS. 2 and 3, the clamping means includes a pair of C-shaped clamps 37 and 38 which are fastened in spaced parallel relation to the rear side wall 18 as by bolts, such as the bolt 39 which passes through the base of the clamp 38 and the rear wall 18. See FIG. 3. The clamp 38 has a pair of ears 38a and 38b which enable the arcuate clamping jaws 38c and 38d, respectively to be spread apart when the ears are pressed together. Thus, a shopper can grip the ears 38a and 38b between the thumb and forefinger of the right and left hand to separate the jaws of the clamps 37 and 38 prior to pulling the organizer 10 rearwardly for mounting the same to the handle 13. The opposite procedure can be used to disengage the organizer 10 from the handle 13. The shopping cart cross wire 14 underlies and engages the bottom of the organizer 10 and functions to prevent the organizer 10 from pivoting about a horizontal axis through the handle 13 when the organizer 10 is connected to the shopping cart handle in the manner illustrated in FIGS. 1 and 2.

To use the organizer 10, a shopper would clip coupons from advertising copy at home and place the coupons in front of the appropriately marked dividers illustrated in FIG. 5. After this has been done, the shopper may close the lid 30 and keep the coupons thus organized until they are ready to be redeemed. The shopper then carries the organizer 10 to the store using the handle 36 in the lid 30. Upon reaching the store and selecting a shopping cart 11, the shopper connects the organizer 10 to the handle 13 at the upper rear end of the basket 12 simply by spreading the ears of the clamps 37 and 38 and pulling the organizer 10 rearwardly to engage the clamps 37 and 38 with the top, bottom and frontal portions of the shopping cart handle 13. The bottom of the organizer 10 is then placed upon the top of the shopping cart cross wire 14, whereby the organizer is mounted in the manner illustrated in FIGS. 1 and 2. Thereafter, the shopper may unlatch the lid 30 and open the same into the position illustrated in FIG. 5 to expose the various dividers. It is noted that the lid opens forwardly away from the shopper while the indicia on the dividers faces rearwardly toward the shopper.

When the shopper reaches the appropriate section of a store aisle where a product, such as cereal, is on display, the shopper may refer to the divider 21 for coupons corresponding to various cereal products and may select the product for which a coupon is to be used. After the product has been placed in the basket 12, the corresponding coupon may be placed ahead of the divider 20 denominated "check-outs". This procedure continues until the shopper has completed product selections and is ready to present the products and coupons to the clerk at the check-out counter. At this point, all of the coupons which are to be used can be removed from their place ahead of the divider 20 and presented to the clerk for appropriate credit. The unused coupons, of course, or coupons to be used for products in other stores are thus retained between the various dividers for use in the above described manner.

In view of the foregoing, it should be apparent that the present invention now provides a coupon organizer which greatly facilitates the use of coupons while shopping. The coupon organizer makes shopping easier by providing the shopper with a portable device which makes the coupons readily available to the shopper at a convenient location with respect to a shopping cart and in an orderly fashion. The coupon organizer is lightweight and hence is readily portable. Moreover, since the organizer is fabricated almost entirely of plastic, it can be manufactured by low-cost, high-speed injection molding techniques.

While a preferred embodiment of the present invention has been described in detail, various modifications, alterations and changes may be made without departing from the spirit and scope of the present invention as defined in the appended claims.

I claim:

1. For use in combination with a shopping cart having a handle extending alongside a transverse basket member at the upper rear end of the cart basket, a coupon organizer, comprising: a portable molded plastic receptacle having an elongated bottom wall and side walls cooperating therewith to define a horizontally-elongated upwardly-open cavity adapted to contain a series of dividers for segregating shopping coupons therewithin, said receptacle being mounted to said cart with one of its elongated side walls confronting said handle and with its bottom wall engaging on and supported by said transverse basket member, C-type clamping means mounted to said one elongated side wall, said clamping means having a pair of resilient arcuate jaws embracing said handle when mounted thereto, said jaws opening and closing resiliently onto said handle for affording releasable engagement and disengagement of said receptacle with said handle when said receptacle is displaced laterally with respect to said handle, a lid hinged to one of said side walls to provide a closure for said receptacle, and means on said receptacle providing a handle for carrying the same.

* * * * *